(12) United States Patent
Yraceburu et al.

(10) Patent No.: US 10,662,011 B2
(45) Date of Patent: May 26, 2020

(54) MEDIA TRANSPORT

(71) Applicant: HEWLETT-PACKARD DEVELOPMENT COMPANY, L.P., Houston, TX (US)

(72) Inventors: Robert Yraceburu, Vancouver, WA (US); Matthew Douglas Reier, Vancouver, WA (US); Kynan Lon Church, Vancouver, WA (US); Elliott Downing, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/177,349

(22) Filed: Oct. 31, 2018

(65) Prior Publication Data
US 2020/0130380 A1   Apr. 30, 2020

(51) Int. Cl.
*B65H 5/08* (2006.01)
*B41J 11/00* (2006.01)
(Continued)

(52) U.S. Cl.
CPC ............ *B65H 5/085* (2013.01); *B41J 11/007* (2013.01); *B41J 13/08* (2013.01); *B41J 13/22* (2013.01); *B65G 15/12* (2013.01); *B65G 23/06* (2013.01); *B65G 23/26* (2013.01); *B65G 47/00* (2013.01); *B65H 5/12* (2013.01); *B65H 5/14* (2013.01); *B65H 29/04* (2013.01); *B65H 29/045* (2013.01);
(Continued)

(58) Field of Classification Search
CPC . B65H 5/085; B65H 5/12; B65H 5/14; B65H 29/04; B65H 29/045; B65H 2301/44712; B65H 2403/20; B65H 2403/30; B65H 2403/72; B65H 2403/721; B41J 11/007; B41J 13/08; B41J 13/22; B65G 15/12; B65G 23/06; B65G 23/26; B65G 47/00; B65G 2201/022; B65G 2812/016; B65G 2812/02148; B65G 2812/02217
See application file for complete search history.

(56) References Cited

U.S. PATENT DOCUMENTS 3,791,643 A * 2/1974 Ito ........................ B65H 29/045
                                                          271/204
3,881,646 A * 5/1975 Nitzsche .................. B41F 21/08
                                                          225/96
(Continued)

FOREIGN PATENT DOCUMENTS

KR            101244390 B1      3/2013

*Primary Examiner* — David H Bollinger
(74) *Attorney, Agent, or Firm* — Dicke Billig & Czaja, PLLC (57) ABSTRACT

A media transport system, includes a transport path, a drive gear at one end of the transport path, a driven gear at an opposite end of the transport path, an endless loop transmission element engaged with the drive gear and the driven gear, a media clamp secured to the endless loop transmission element, and a one-way clutch coupled with the driven gear. The endless loop transmission element is to rotate in one direction to move the media clamp and transport media from the one end of the transport path toward the opposite end of the transport path, and the one-way clutch is to allow rotation of the driven gear in the one direction and resist rotation of the driven gear in an opposite direction.

15 Claims, 7 Drawing Sheets

(51) Int. Cl.

| | |
|---|---|
| *B41J 13/08* | (2006.01) |
| *B41J 13/22* | (2006.01) |
| *B65G 15/12* | (2006.01) |
| *B65G 23/06* | (2006.01) |
| *B65G 47/00* | (2006.01) |
| *B65G 23/26* | (2006.01) |
| *B65H 5/12* | (2006.01) |
| *B65H 29/04* | (2006.01) |
| *B65H 5/14* | (2006.01) |

(52) U.S. Cl.
CPC .. *B65G 2201/022* (2013.01); *B65G 2812/016* (2013.01); *B65G 2812/02148* (2013.01); *B65G 2812/02217* (2013.01); *B65H 2301/44712* (2013.01); *B65H 2403/20* (2013.01); *B65H 2403/30* (2013.01); *B65H 2403/72* (2013.01); *B65H 2403/721* (2013.01)

(56) References Cited

U.S. PATENT DOCUMENTS

| | | | | |
|---|---|---|---|---|
| 4,155,545 | A | * | 5/1979 | Yanagawa ............ B65H 3/0669 271/10.09 |
| 5,320,341 | A | * | 6/1994 | Pease .................... B65H 5/085 271/202 |
| 6,478,297 | B1 | * | 11/2002 | Messerschmid ....... B65H 5/085 198/803.1 |
| 6,923,119 | B1 | * | 8/2005 | Frank ..................... B41F 21/08 101/232 |
| 7,249,761 | B2 | | 7/2007 | Greet et al. |
| 7,530,439 | B2 | | 5/2009 | Yamada et al. |
| 8,358,959 | B2 | | 1/2013 | Yamada et al. |
| 8,777,220 | B2 | | 7/2014 | Oshiro et al. |
| 8,860,958 | B2 | | 10/2014 | Ito et al. |
| 2012/0275939 | A1 | | 11/2012 | Kushida et al. |
| 2017/0320700 | A1 | | 11/2017 | Proffitt et al. |
| 2018/0257404 | A1 | * | 9/2018 | Johnson ............... B41J 13/0036 |

* cited by examiner

MEDIA TRANSPORT

BACKGROUND

Imaging devices may perform actions on or with media. For example, imaging devices may print, scan, copy, or perform other actions on or with the media, and may transport the media through the imaging device, into or out of the imaging device, or from the imaging device to another device. In transporting media, imaging devices may transport media of different sizes, thicknesses, or materials.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure.

Figure 1:
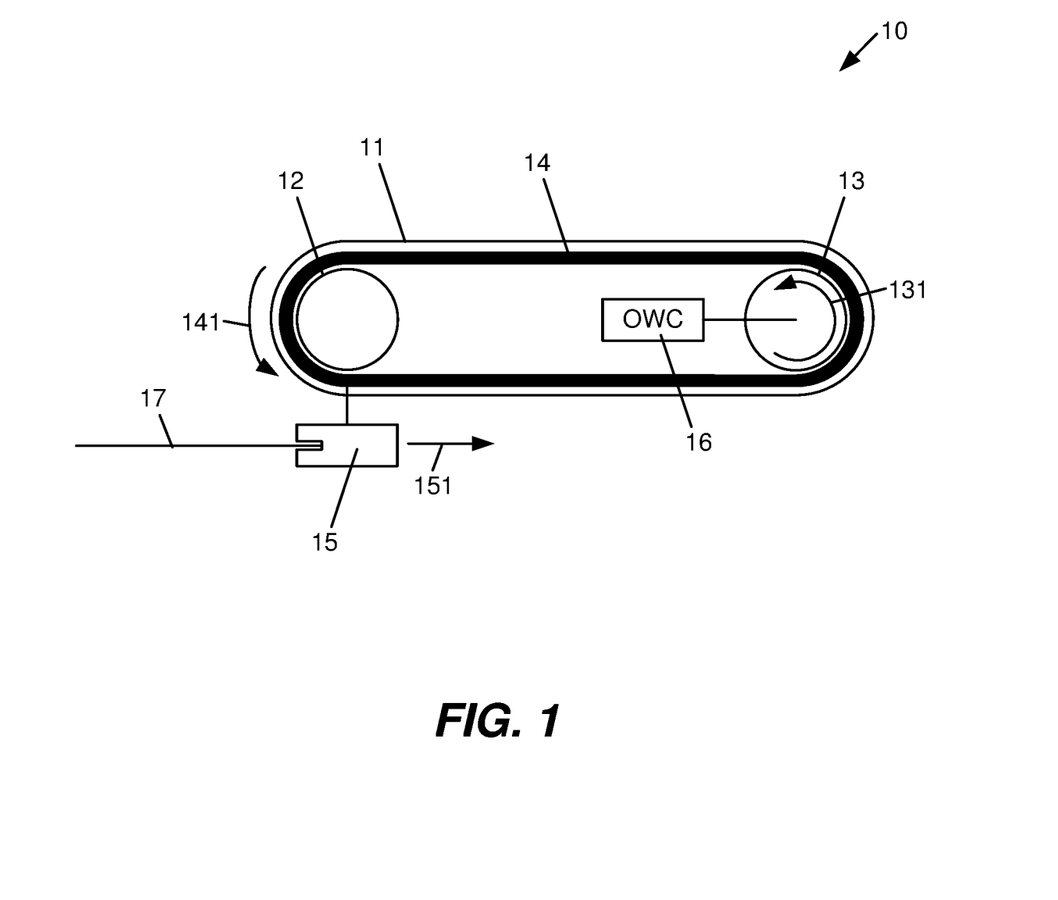
FIG. 1 is a block diagram illustrating an example of a media transport system.

As illustrated in the example of FIG. 1, the present disclosure provides a media transport system 10. In one implementation, media transport system 10 includes a transport path 11, a drive gear 12 at one end of the transport path, a driven gear 13 at an opposite end of the transport path, an endless loop transmission element 14 engaged with the drive gear and the driven gear, a media clamp 15 secured to the endless loop transmission element, and a one-way clutch (OWC) 16 coupled with the driven gear. In one example, the endless loop transmission element is to rotate in one direction (for example, counter-clockwise in the illustrated orientation of FIG. 1, as indicated by arrow 141) to move the media clamp 15 and transport media 17 from the one end of the transport path toward the opposite end of the transport path, as indicated by arrow 151, and the one-way clutch 16 is to allow rotation of the driven gear in the one direction (for example, counter-clockwise in the illustrated orientation of FIG. 1, as indicated by arrow 131) and resist rotation of the driven gear in an opposite direction (for example, clockwise in the illustrated orientation of FIG. 1).

As disclosed herein, a one-way clutch coupled to a driven gear, such as one-way clutch 16 coupled to driven gear 13, allows rotation of the driven gear in one direction, and resists or prevents rotation of the driven gear in an opposite direction. As such, reverse rotation of an endless loop transmission element engaged with the driven gear, such as endless loop transmission element 14 engaged with driven gear 13, may be prevented. Thus, a media clamp secured to the endless loop transmission element, such as media clamp 15, may be prevented from being driven in a reverse direction, thereby avoiding potential damage to the media clamp.

In addition, with a one-way clutch allowing rotation of a driven gear in one direction and resisting or preventing rotation of the driven gear in an opposite direction, such as one-way clutch 16 allowing rotation of driven gear 13 in one direction and resisting or preventing rotation of driven gear 13 in an opposite direction, as disclosed herein, tension of an endless loop transmission element engaged with the driven gear, such as endless loop transmission element 14 engaged with driven gear 13, may be verified. Thus, rotation (e.g., slipping or skipping) of the endless loop transmission element relative to the driven gear (and/or a drive gear with which the endless loop transmission element is also engaged), such as rotation of endless loop transmission element 14 relative to driven gear 13 (and/or drive gear 12), may be avoided.

Figure 2:
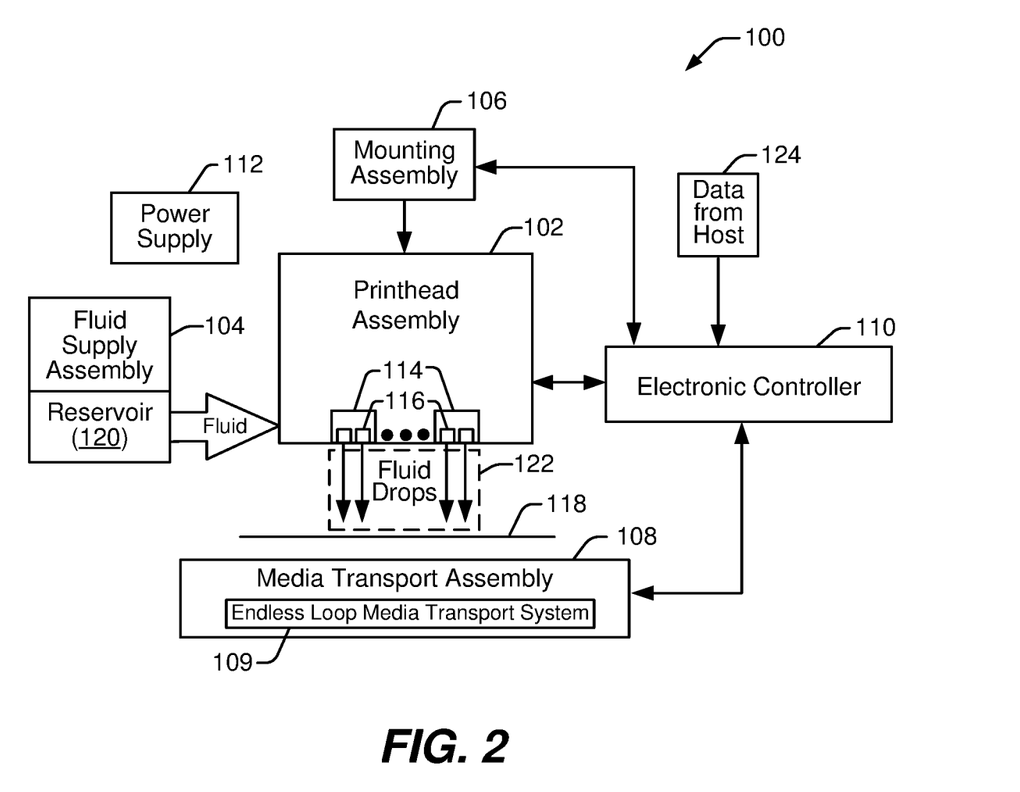
FIG. 2 is a block diagram illustrating an example of an inkjet printing system.

FIG. 2 illustrates an example of an inkjet printing system including an example of a fluid ejection device, as disclosed herein. Inkjet printing system 100 includes a printhead assembly 102, as an example of a fluid ejection assembly, a fluid (e.g., ink) supply assembly 104, a mounting assembly 106, a media transport assembly 108, an electronic controller 110, and a power supply 112 that provides power to electrical components of inkjet printing system 100. Printhead assembly 102 includes a printhead die 114, as an example of a fluid ejection die, that ejects drops of fluid through a plurality of orifices or nozzles 116 toward a print media 118 so as to print on print media 118.

Print media 118 can be any type of suitable sheet or roll material, such as paper, card stock, transparencies, Mylar, and the like, and may include rigid or semi-rigid material, such as cardboard or other panels. Nozzles 116 are typically arranged in columns or arrays such that properly sequenced ejection of fluid from nozzles 116 causes characters, symbols, and/or other graphics or images to be printed on print media 118 as printhead assembly 102 and print media 118 are moved relative to each other.

Fluid supply assembly 104 supplies fluid to printhead assembly 102 and, in one example, includes a reservoir 120 for storing fluid such that fluid flows from reservoir 120 to printhead assembly 102. In one example, printhead assembly 102 and fluid supply assembly 104 are housed together in an inkjet cartridge or pen. In another example, fluid supply assembly 104 is separate from printhead assembly 102 and supplies fluid to printhead assembly 102 through an interface connection, such as a supply tube.

Mounting assembly 106 positions printhead assembly 102 relative to media transport assembly 108, and media transport assembly 108 positions print media 118 relative to printhead assembly 102. Thus, a print zone 122 is defined adjacent to nozzles 116 in an area between printhead assembly 102 and print media 118. In one example, printhead assembly 102 is a scanning type printhead assembly. As such, mounting assembly 106 includes a carriage for moving printhead assembly 102 relative to media transport assembly 108 to scan print media 118. In another example, printhead assembly 102 is a non-scanning type printhead assembly. As such, mounting assembly 106 fixes printhead assembly 102 at a prescribed position relative to media transport assembly 108. Thus, media transport assembly 108 positions print media 118 relative to printhead assembly 102.

In one implementation, media transport assembly 108 includes an endless loop media transport system, as identified at 109, for transporting media within inkjet printing system 100. Transporting media may be useful for post-print operations, such as stack alignment, stapling, offset, and other finishing operations.

Electronic controller 110 typically includes a processor, firmware, software, memory components including volatile and non-volatile memory components, and other printer electronics for communicating with and controlling printhead assembly 102, mounting assembly 106, and media transport assembly 108. Electronic controller 110 receives data 124 from a host system, such as a computer, and temporarily stores data 124 in a memory. Typically, data 124 is sent to inkjet printing system 100 along an electronic, infrared, optical, or other information transfer path. Data 124 represents, for example, a document and/or file to be printed. As such, data 124 forms a print job for inkjet printing system 100 and includes print job commands and/or command parameters.

In one example, electronic controller 110 controls printhead assembly 102 for ejection of fluid drops from nozzles 116. Thus, electronic controller 110 defines a pattern of ejected fluid drops which form characters, symbols, and/or other graphics or images on print media 118. The pattern of ejected fluid drops is determined by the print job commands and/or command parameters.

Printhead assembly 102 includes one (i.e., a single) printhead die 114 or more than one (i.e., multiple) printhead die 114. In one example, printhead assembly 102 is a wide-array or multi-head printhead assembly. In one implementation of a wide-array assembly, printhead assembly 102 includes a carrier that carries a plurality of printhead dies 114, provides electrical communication between printhead dies 114 and electronic controller 110, and provides fluidic communication between printhead dies 114 and fluid supply assembly 104.

In one example, inkjet printing system 100 is a drop-on-demand thermal inkjet printing system wherein printhead assembly 102 includes a thermal inkjet (TIJ) printhead that implements a thermal resistor as a drop ejecting element to vaporize fluid in a fluid chamber and create bubbles that force fluid drops out of nozzles 116. In another example, inkjet printing system 100 is a drop-on-demand piezoelectric inkjet printing system wherein printhead assembly 102 includes a piezoelectric inkjet (PIJ) printhead that implements a piezoelectric actuator as a drop ejecting element to generate pressure pulses that force fluid drops out of nozzles 116.

Figure 3:
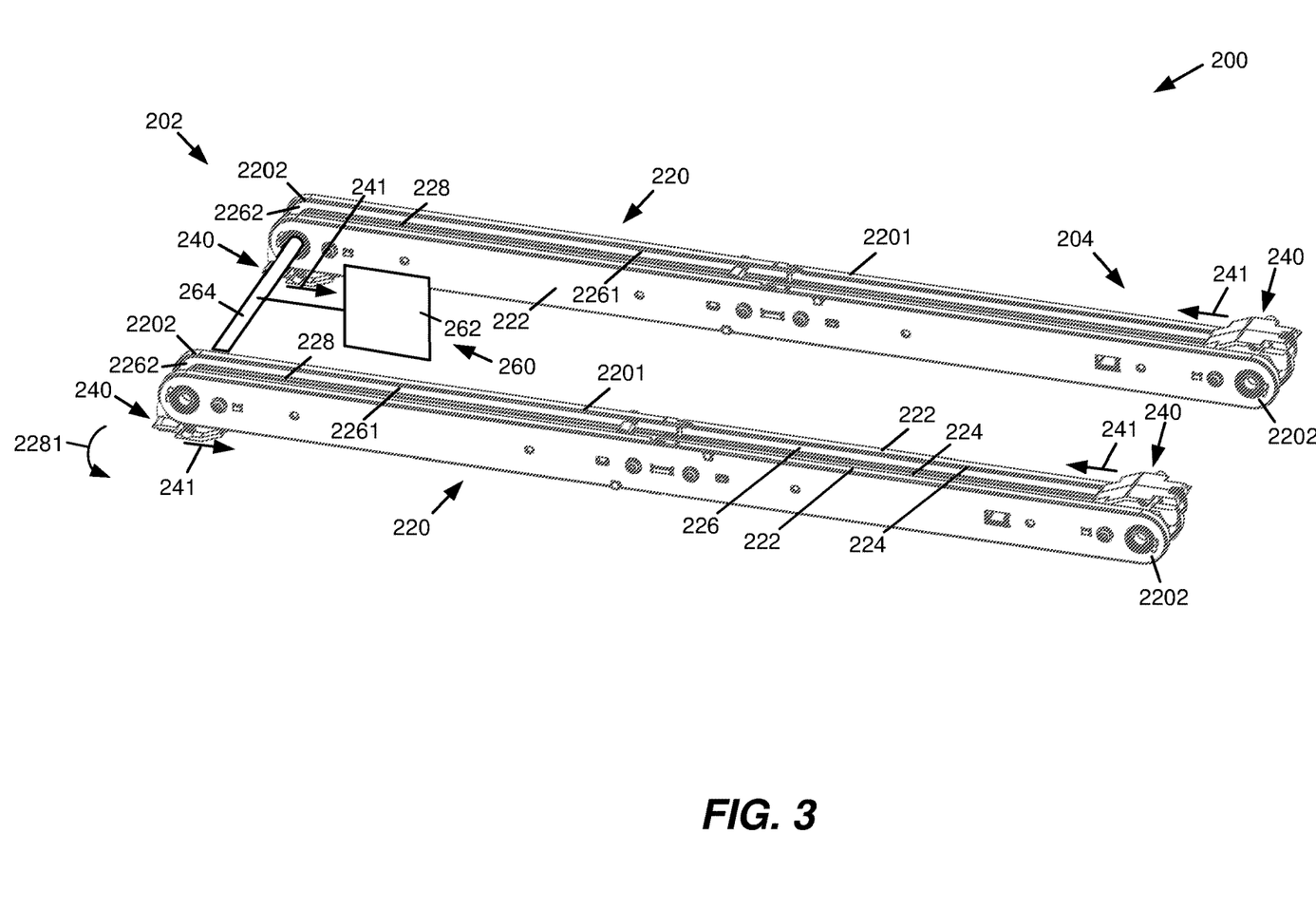
FIG. 3 is a schematic illustration of an example of a media transport system for a printing system.

FIG. 3 is a schematic illustration of an example of an endless loop media transport system 200 for a printing system, such as endless loop media transport system 109 for inkjet printing system 100 (FIG. 2). In one implementation, media transport system 200 includes puller tracks 220, puller clamps 240 each supported on a respective puller track 220, and a puller drive system 260 to move puller clamps 240 along puller tracks 220, whereby puller tracks 220 define a transport path for puller clamps 240, and puller clamps 240 represent media clamps that accept and transport or "pull" media along a portion of the transport path, as disclosed herein. In one implementation, puller tracks 220, with respective puller clamps 240, include a pair of puller tracks 220 spaced from each other. In one example, puller tracks 220 are positioned on each side of a centerline of incoming media, for example, an outputted sheet of printed media.

In the illustrated example, media transport system 200, including each puller track 220, includes an end 202 and an opposite end 204. In one example, end 202 represents an "intake" or receiving end of media transport system 200, and end 204 represents an "output" or releasing end of media transport system 200 such that media transport system 200 transports media, such as print media 118 (FIG. 2), from end 202 toward or to end 204. More specifically, media transport system 200 accepts media at end 202, transports or "pulls" media from end 202 toward or to end 204, and releases media adjacent to or at end 204.

Puller tracks 220 guide puller clamps 240 and control opening and closing of puller clamps 240 as puller clamps 240 are moved or guided along puller tracks 220. For example, in one implementation, puller clamps 240 are opened at end 202 to receive or capture a sheet of media, and are closed to transport the sheet of media toward or to end 204, whereby puller clamps 240 then release the media. More specifically, in one example, as puller clamps 240 are moved within puller track 220 (for example, by a belt, chain, or other transmission element or component), puller clamps 240 are either opened or closed depending on a location of puller clamps 240 relative to straight and curved portions of puller track 220. As such, in one implementation, puller clamps 240 are opened as puller clamps 240 rotate around curved portions of puller track 220, and are closed as puller clamps 240 are in straight portions of puller tracks 220.

In one example, an input or intake sequence of media transport system 200 includes positioning of puller clamps 240 at "intake" or receiving end 202 of media transport system 200. For example, in one implementation, as a sheet of media approaches media transport system 200, puller clamps 240 are positioned along puller track 220 such that puller clamps 240 are held in an open or "media accept" position. With puller clamps 240 in the open or media accept position, a sheet of media, namely, a leading edge of the sheet media, may enter a throat or pinch of puller clamps 240. In one implementation, puller drive system 260 synchronizes a speed of movement of puller clamps 240 to a speed of output of printed media such that input to media transport system 200 is synchronized with output of the printing system. In one example, the input or intake sequence is repeated for each sheet in a print (or copy) job.

In the example illustrated in FIG. 3, media transport system 200 includes two puller clamps 240 on each puller track 220. While two puller clamps 240 are illustrated on each puller track 220, more or fewer puller clamps 240 may be utilized on each puller track 220.

Figure 4:
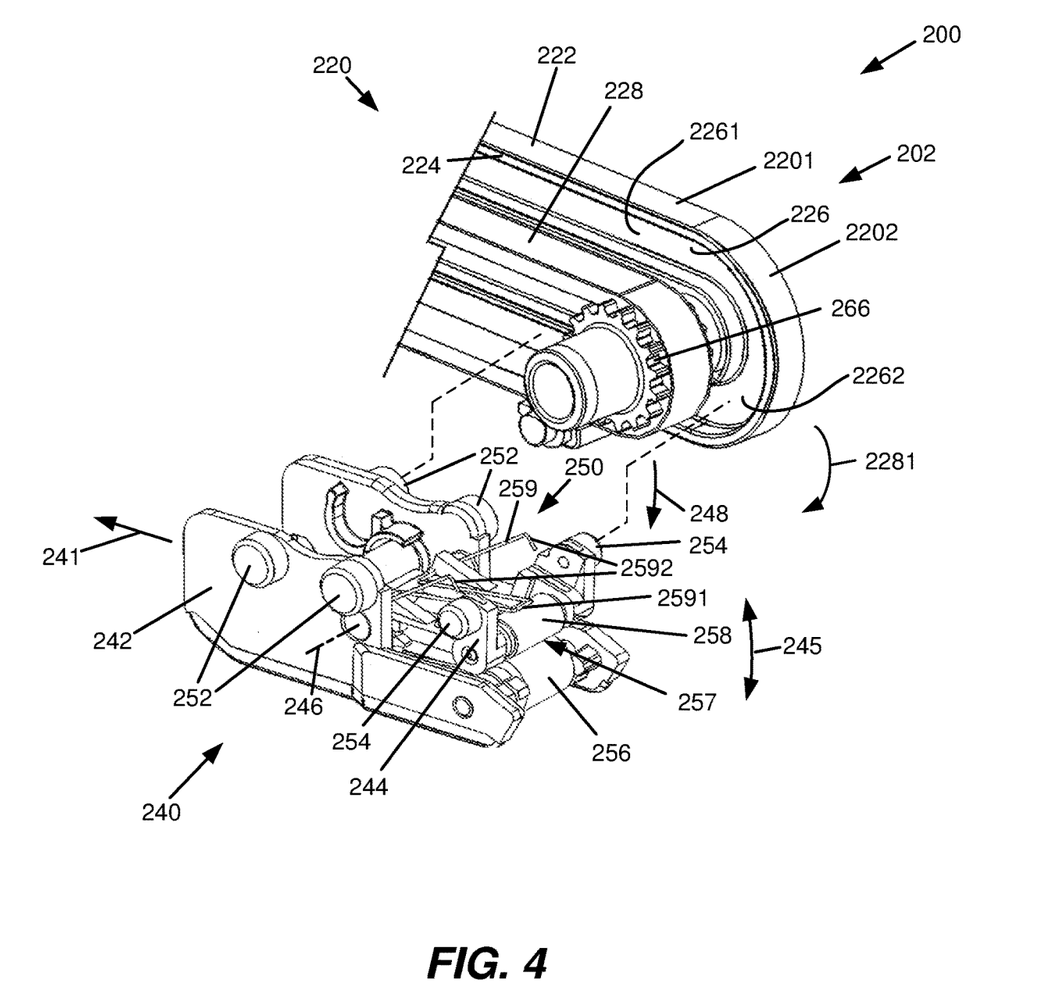
FIG. 4 is an exploded perspective view illustrating an example of a drive end of a media transport system.

In one implementation, and as illustrated in the examples of FIGS. 3 and 4, each puller track 220 includes opposing sideplates 222 with facing or opposing surfaces or sides 224 and channels or grooves 226 formed in facing or opposing surfaces or sides 224. In addition, each puller track 220 includes an endless loop transmission element or component, such as a belt 228, supported between sideplates 222 for linear movement between opposite ends of puller track 220 relative to sideplates 222. As such, puller clamps 240 are secured or attached to belt 228 for movement with belt 228 between opposite ends of puller track 220. In one implementation, belt 228 is an endless belt supported for rotation between sideplates 222, with multiple puller clamps 240 (e.g., two puller clamps 240) spaced (e.g., equidistant) around a length of belt 228, such that, as belt 228 rotates, puller clamps 240 move (and rotate) between opposite ends of puller track 220, as indicated by arrows 241.

In one implementation, and as illustrated in the examples of FIGS. 3 and 4, each puller track 220 includes a straight or linear portion 2201, with upper and lower straight or linear channel or groove portions 2261, and curved portions 2202, with respective curved channel or groove portions 2262, at opposite ends thereof. As such, upper and lower straight or linear channel or groove portions 2261 and curved channel or groove portions 2262 form a continuous or endless loop channel or groove between and to opposite ends of puller track 220, whereby each puller track 220 forms a continuous or endless loop transport path. Thus, with puller clamps 240 attached to a respective belt 228, puller clamps 240 follow or move within a path including two straight portions and two curved portions that rotate puller clamps 240 through 180 degrees two times (i.e., at each end of puller track 220).

Puller drive system 260 moves puller clamps 240 along puller tracks 220. More specifically, puller drive system 260 moves belt 228 and puller clamps 240, as attached to belt 228, relative to puller track 220. In one example, puller drive system 260 rotates belt 228 to move belt 228 and puller clamps 240, as attached to belt 228, relative to puller track 220.

In one implementation, puller drive system 260 includes a drive motor 262 that supplies rotational motion to belt 228 by way of a shaft 264 and a pulley or gear 266 (FIG. 4) which is mounted on shaft 264 (e.g., between sideplates 222 of puller track 220) and engaged or meshed with belt 228 such that belt 228 extends around pulley or gear 266, whereby pulley or gear 266 represents a drive pulley or drive gear. In one example, drive motor 262 is operated such that belt 228 is rotated in one direction (namely, counter-clockwise in the illustrated orientation of FIG. 3, as indicated by arrow 2281, and clockwise in the illustrated orientation of FIG. 4, as indicated by arrow 2281), whereby puller clamps 240, as secured to belt 228, are transported from end 202 to end 204 and back to end 202 (FIG. 3). As such, in one implementation, end 202 represents a drive end of media transport system 200 and end 204 represents a driven end of media transport system 200.

FIG. 4 is an exploded perspective view illustrating an example of a drive end of media transport system 200 including, more specifically, an example of a portion of puller track 220 and an example of puller clamp 240 at end 202 of media transport system 200.

In the illustrated example, puller clamp 240 includes a carriage or shuttle 242 and a swingarm or pivot member 244 pivotally coupled with shuttle 242. In one example, shuttle 242 is coupled with or attached to belt 228 such that shuttle 242 moves with belt 228. Since pivot member 244 is pivotally coupled with shuttle 242, pivot member 244 also moves with belt 228. However, as pivot member 244 moves with belt 228, pivot member 244 also pivots relative to shuttle 242, as indicated by double arrow 245. In one example, pivoting of pivot member 244 relative to shuttle 242 creates or establishes an open position and a closed position of puller clamp 240, as disclosed herein. In one example, pivot member 244 pivots relative to shuttle 242 about an axis 246.

In one example, shuttle 242 and pivot member 244 include respective features which interact within channels or grooves 226 of puller track 220 to retain and guide shuttle 242 and pivot member 244 within puller track 220. For example, in one implementation, shuttle 242 and pivot member 244 include respective tabs or pins 252 and 254 which slide within channels or grooves 226 of puller track 220 to retain and guide shuttle 242 and pivot member 244 within puller track 220. In one example, shuttle 242 includes two sets of pins 252 protruding or extending on opposite sides thereof, and pivot member 244 includes one set of pins 254 protruding or extending from opposite sides thereof. As such, pins 252 and pins 254 slide within channels or grooves 226 of puller track 220 to open and close puller clamp 240 as puller clamp 240 moves along or around puller track 220. More specifically, pins 252 and pins 254 slide within channels or grooves 226 of puller track 220 and provide pivoting of pivot member 244 relative to shuttle 242 (due to pivot member 244 being pivotally coupled with shuttle 242) to open and close puller clamp 240 as puller clamp 240 moves along or around puller track 220.

In one implementation, shuttle 242 and pivot member 244 include opposing rollers 256 and 258, respectively. As such, rollers 256 and 258 create a nip or pinch zone or pinch 257 to receive and hold a sheet of media. In one example, pinch 257 is opened and closed as puller clamp 240 moves along or around puller track 220. More specifically, as shuttle 242 and pivot member 244 move through curved portion 2202 of puller track 220, pivot member 244 pivots relative to shuttle 242 to open and close pinch 257, thereby opening/closing puller clamp 240.

In one implementation, pivot member 244 is biased to the closed position, for example, in a direction indicated by arrow 248. In one example, pivot member 244, including, more specifically, roller 258 of pivot member 244, is biased by a bias member 250 supported by and engaged with shuttle 242 and/or pivot member 244 such that a bias force is applied in the direction indicated by arrow 248. In one implementation, bias member 250 includes a spring 259 having a portion 2591 engaged with roller 258 of pivot member 244 and arms 2592 that engage a portion of puller track 220 as puller clamp 240 moves along or around puller track 220.

Figure 5:
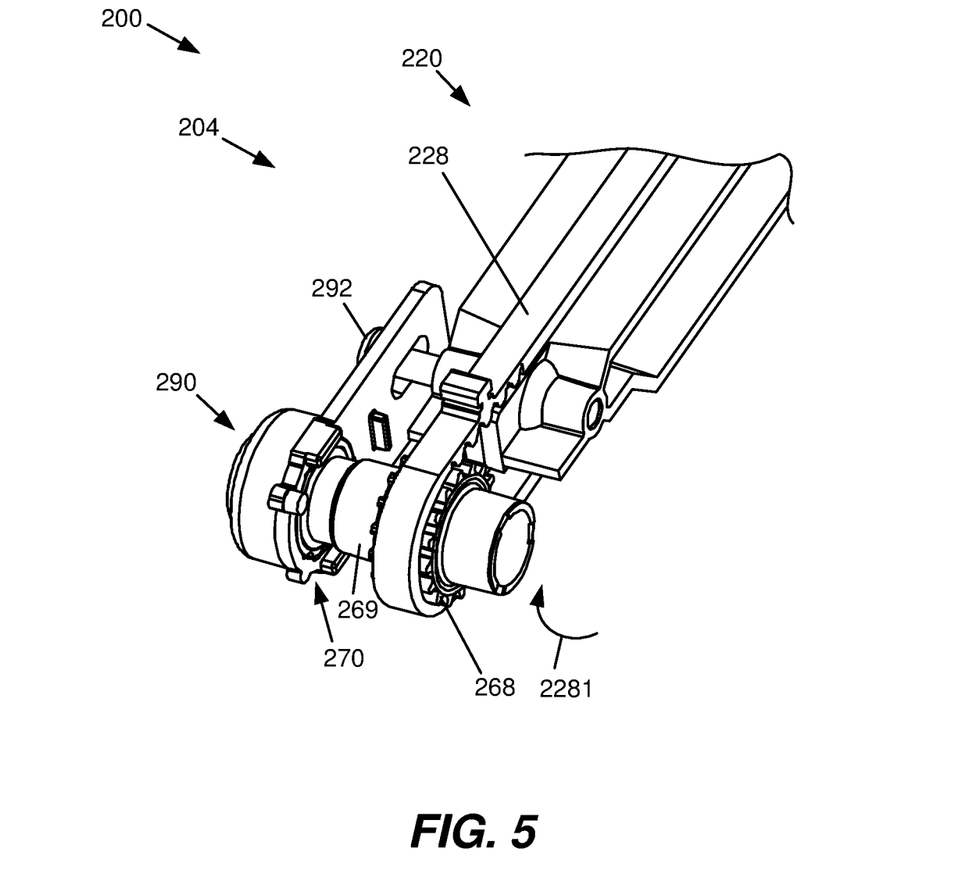
FIG. 5 is a perspective view illustrating an example of a driven end of a media transport system.
Figure 6:
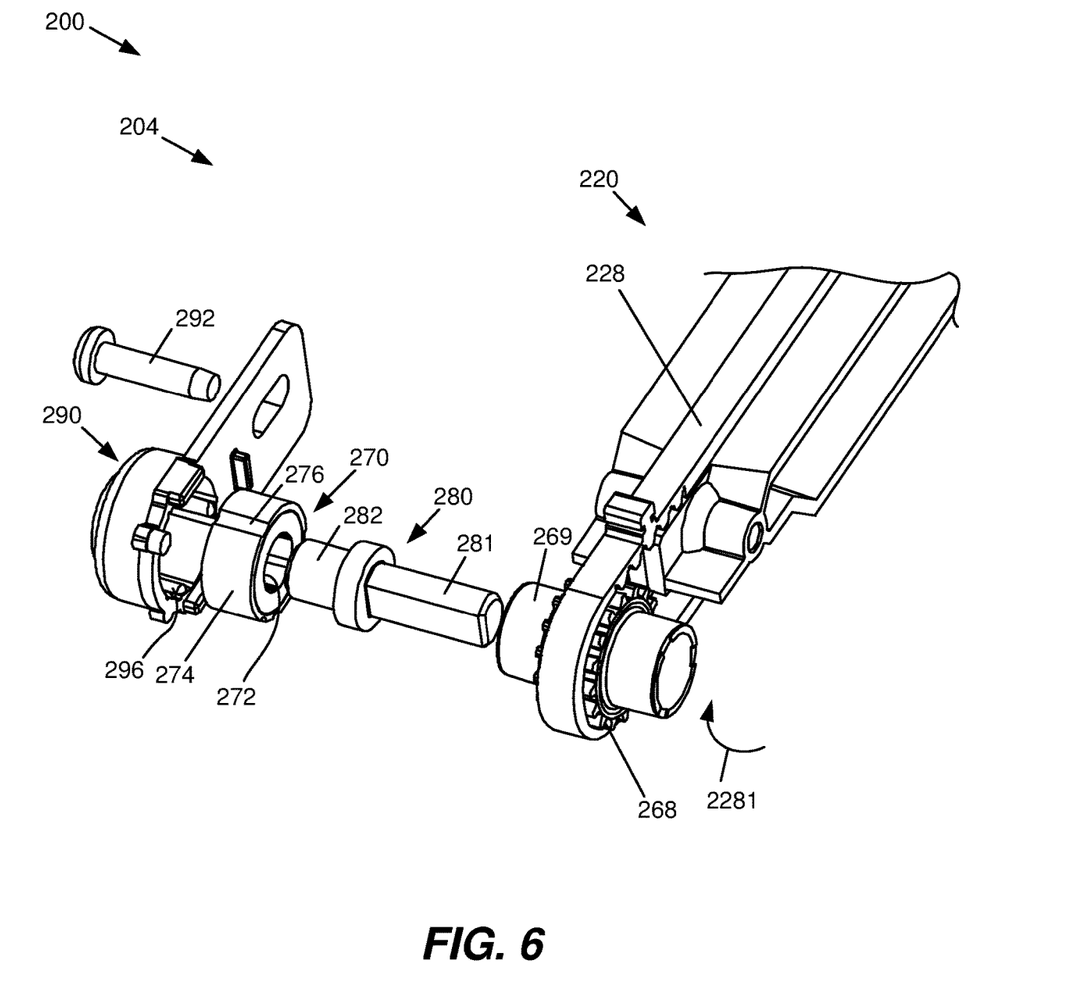
FIG. 6 is an exploded perspective view illustrating an example of a driven end of a media transport system.

FIGS. 5 and 6 are perspective and exploded perspective views, respectively, illustrating an example of a driven end of media transport system 200 including, more specifically, an example of a portion of puller track 220 and belt 228 at end 204 of media transport system 200.

In one example, as disclosed herein, drive motor 262 of puller drive system 260 (FIG. 3) supplies rotational motion to belt 228 by way of shaft 264 and pulley or gear 266 at end 202 (FIGS. 3, 4). At end 204, belt 228 is engaged or meshed with a pulley or gear 268 such that belt 228 extends around pulley or gear 268. As such, pulley or gear 268 represents a driven pulley or driven gear. In one example, drive motor 262 (FIG. 3) is operated such that belt 228 is rotated in one direction (namely, clockwise in the illustrated orientation of FIGS. 4, 5, 6, as indicated by arrow 2281, and counter-clockwise in the illustrated orientation of FIG. 3, as indicated by arrow 2281), whereby puller clamps 240, as secured to belt 228, are transported from end 202 to end 204 and back to end 202 (FIGS. 3, 4).

In one example, media transport system 200 includes a one-way clutch 270 to allow rotation of pulley or gear 268 (referred to hereinafter as gear 268) in one direction and resist or prevent rotation of gear 268 in an opposite direction. More specifically, one-way clutch 270 allows rotation of pulley or gear 268 in a direction to transport or "pull" media from end 202 toward or to end 204 (namely, clockwise in the illustrated orientation of FIGS. 5, 6), and resists or prevents rotation of gear 268 in an opposite direction (namely, counter-clockwise in the illustrated orientation of FIGS. 5, 6).

In one implementation, one-way clutch 270 is supported by a shaft 280 coupled with gear 268 and is retained in a non-rotatable holder 290. More specifically, in one example, shaft 280 has an end 281 interlocked with gear 268 for rotation with gear 268, and has an end 282 supporting one-way clutch 270 such that one-way clutch 270 is supported for rotation with gear 268. In one example, end 281 of shaft 280 has a D-shape to interlock shaft 280 with a hub 269 of gear 268 having a corresponding D-shape. In one example, holder 290 is secured to puller track 220 by a pin 292 such that holder 290 is non-rotatable relative to puller track 220.

In one implementation, one-way clutch 270 includes an inner race 272 and an outer race 274 such that inner race 272 is rotatable relative to outer race 274. More specifically, inner race 272 is engaged with shaft 280 and outer race 274 is engaged with holder 290 such that inner race 272 of one-way clutch 270 is coupled and supported for rotation with gear 268, and outer race 274 of one-way clutch 270 is retained for non-rotation in holder 290. In one example, outer race 274 and holder 290 include mating anti-rotation features (for example, corresponding ribs 296 and grooves 276) to prevent rotation of outer race 274. As such, one-way clutch 270 allows rotation of gear 268 in one direction (namely, clockwise in the illustrated orientation of FIGS. 5, 6), and resists or prevents rotation of gear 268 in an opposite direction (namely, counter-clockwise in the illustrated orientation of FIGS. 5, 6).

In one implementation, drive system 260 may be operated to determine or verify tension of belt 228. For example, as disclosed herein, for transport of media from end 202 toward or to end 204, drive motor 262 (FIG. 3) is operated to rotate gear 266 (FIG. 4) and, therefore, belt 228 and gear 268 in one direction (for example, counter-clockwise in the illustrated orientation of FIG. 3 and clockwise in the illustrated orientation of FIGS. 4, 5, 6). As such, one-way clutch 270 allows rotation of gear 268 in the same one direction.

In one example, to determine or verify tension of belt 228, drive motor 262 may be operated in a reverse manner. More specifically, drive motor 262 may be operated to apply reverse rotation to gear 266 and, therefore, belt 228 and gear 268. With one-way clutch 270 coupled to gear 268, however, one-way clutch 270 resists reverse rotation of gear 268 from the reverse operation of drive motor 262. Thus, with sufficient tension of belt 228, belt 228 and, therefore, gear 266 (and an output of drive motor 262) also resist reverse rotation from the reverse operation of drive motor 262.

However, with insufficient tension of belt 228, belt 228 may rotate relative to gear 268 and/or gear 266 from the reverse operation of drive motor 262. More specifically, reverse rotation due to the reverse operation of drive motor 262 may result from belt 228 rotating relative to gear 268 and/or gear 266 (e.g., belt 228 slipping on or skipping teeth of gear 268 and/or gear 266). As such, drive motor 262 (namely, an output of drive motor 262) may rotate in reverse.

In one example, a degree or amount of reverse rotation from the reverse operation of drive motor 262 may be determined or measured such that reverse rotation exceeding a predetermined level or threshold may indicate insufficient (or improper) tension of belt 228. As such, if tension of belt 228 is insufficient, tension of belt 228 may be adjusted (i.e., increased). In one example, a degree or amount of reverse rotation from the reverse operation of drive motor 262 may be determined or measured by an encoder.

Figure 7A:
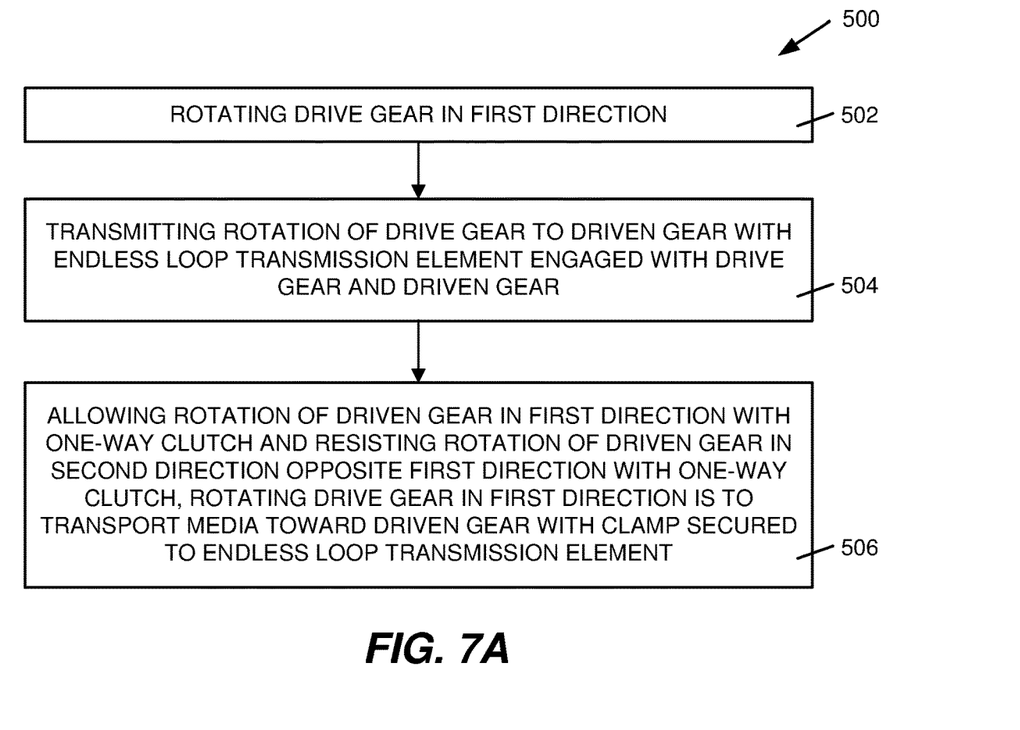
FIGS. 7A, 7B are flow diagrams illustrating an example of a method of operating a media transport system.
Figure 7B:
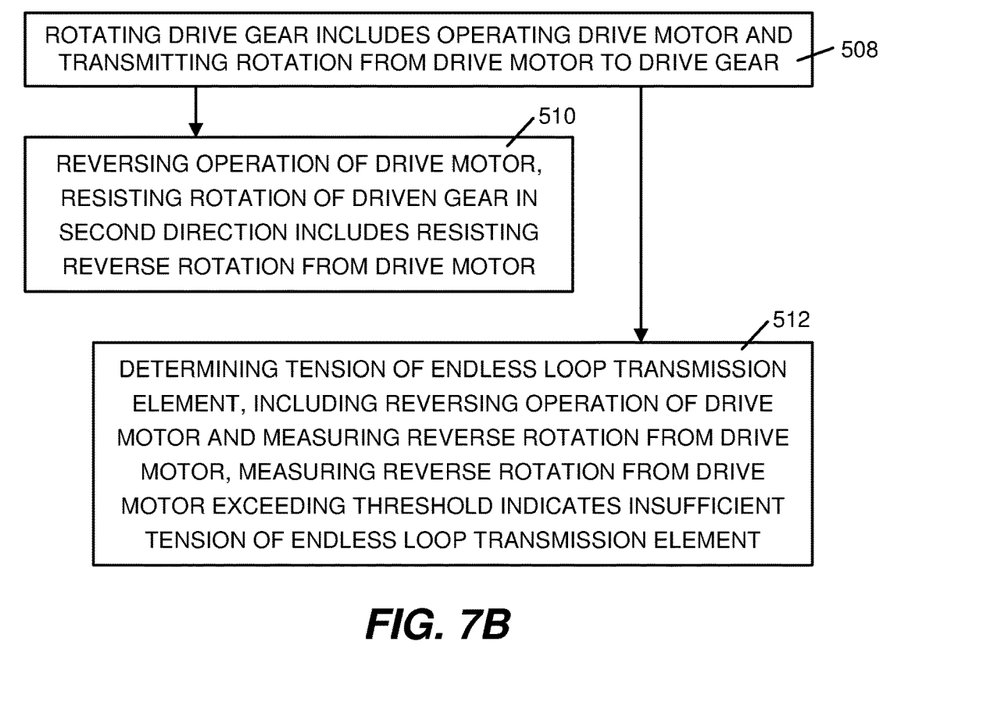

FIGS. 7A, 7B are flow diagrams illustrating an example of a method 500 of operating a media transport system, such as media transport system 200 as illustrated in the examples of FIGS. 3, 4, 5, 6.

In one example, as illustrated in FIG. 7A, at 502, method 500 includes rotating a drive gear in a first direction, such as rotating gear 266 in a first direction (for example, clockwise in the illustrated orientation of FIG. 4).

As such, at 504, method 500 includes transmitting rotation of the drive gear to a driven gear with an endless loop transmission element engaged with the drive gear and the driven gear, such as transmitting rotation of gear 266 to gear 268 with belt 228 engaged with gear 266 and gear 268.

As such, at 506, method 500 includes allowing rotation of the driven gear in the first direction with a one-way clutch and resisting rotation of the driven gear in a second direction opposite the first direction with the one-way clutch, such as allowing rotation of gear 268 in the first direction (for example, clockwise in the illustrated orientation of FIGS. 5, 6) with one-way clutch 270 and resisting rotation of gear 268 in a second direction opposite the first direction (for example, counter-clockwise in the illustrated orientation of FIGS. 5, 6) with one-way clutch 270.

In one example, with method 500, rotating the drive gear in the first direction is to transport media toward the driven gear with a clamp secured to the endless loop transmission element, such as rotating gear 266 in the first direction (for example, clockwise in the illustrated orientation of FIG. 4) to transport media toward gear 268 with puller clamp 240 secured to belt 228.

In one example, as illustrated in FIG. 7B, at 508, rotating the drive gear, for example, at 502, includes operating a drive motor and transmitting rotation from the drive motor to the drive gear, such as operating drive motor 262 and transmitting rotation from drive motor 262 to drive gear 266.

As such, in one example, at 510, method 500 includes reversing operation of the drive motor, wherein resisting rotation of the driven gear in the second direction includes resisting reverse rotation from the drive motor, such as reversing operation of drive motor 262, wherein resisting rotation of driven gear 268 in the second direction includes resisting reverse rotation from drive motor 262.

As such, in one example, at 512, method 500 includes determining tension of the endless loop transmission element, including reversing operation of the drive motor and measuring reverse rotation from the drive motor, wherein measuring reverse rotation from the drive motor exceeding a threshold indicates insufficient tension of the endless loop transmission element, such as determining tension of belt 228, including reversing operation of drive motor 262 and measuring reverse rotation from drive motor 262, wherein measuring reverse rotation from drive motor 262 exceeding a threshold indicates insufficient tension of belt 228.

As disclosed herein, one-way clutch 270 allows rotation of gear 268 in one direction, and resists or prevents rotation of gear 268 in an opposite direction such that belt 228, as engaged with gear 268, is prevented from being rotated in the opposite direction. As such, puller clamps 240, which are secured to belt 228 and are intended to transport media in a direction from end 202 toward or to end 204, may be prevented from being driven in a reverse direction. Thus, potential damage to puller clamps 240 or other components of media transport system 200 may be avoided.

In addition, with one-way clutch 270 allowing rotation of gear 268 in one direction and resisting or preventing rotation of gear 268 in an opposite direction, as disclosed herein, tension of belt 228, as engaged with gear 268 and gear 266, may be verified. More specifically, tension of belt 228 may be verified by reversing operation of drive motor 262. Verifying tension of belt 228 helps to ensure that belt 228 is properly or sufficiently tensioned, as improper or insufficient tensioning of belt 228 may result in belt 228 rotating relative to gear 268 and/or gear 266 (e.g., slipping on or skipping teeth of gear 268 and/or gear 266) thereby possibly causing issues with media transport system 200 such as, for example, media jams during transport of media with puller clamps 240.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein.

The invention claimed is:

1. A media transport system, comprising:
a transport path;
a drive gear at one end of the transport path;
a driven gear at an opposite end of the transport path;
an endless loop transmission element engaged with the drive gear and the driven gear;
a media clamp secured to the endless loop transmission element; and
a one-way clutch coupled with the driven gear,
the endless loop transmission element to rotate in one direction to move the media clamp and transport media from the one end of the transport path toward the opposite end of the transport path, and the one-way clutch to allow rotation of the driven gear in the one direction and resist rotation of the driven gear in an opposite direction.

2. The media transport system of claim 1, the media clamp to receive media at the one end of the transport path, transport the media toward the opposite end of the transport path, and release the media at the opposite end of the transport path.

3. The media transport system of claim 1, the one-way clutch including an inner race coupled for rotation with the driven gear, and an outer race retained for non-rotation.

4. The media transport system of claim 1, further comprising:
a shaft having a first end interlocked with the driven gear and a second end supporting the one-way clutch.

5. The media transport system of claim 1, further comprising:
a drive motor operatively coupled with the drive gear,
the drive motor to be operated to rotate the endless loop transmission element in the one direction, and the one-way clutch to allow rotation of the driven gear in the one direction from the operation of the drive motor.

6. The media transport system of claim 5, the drive motor to be operated in reverse, and the one-way clutch to resist rotation of the driven gear in the opposite direction from the reverse operation of the drive motor.

7. The media transport system of claim 6, wherein reverse rotation from the reverse operation of the drive motor exceeding a threshold indicates insufficient tension of the endless loop transmission element.

8. A media transport system, comprising:
a transport path;
a media clamp guided by the transport path; and
a drive system to move the media clamp along the transport path,
the drive system comprising:
an endless loop transmission element rotatably supported by the transport path, the media clamp secured to the endless loop transmission element;
a drive gear at one end of the transport path to drive the endless loop transmission element;
a driven gear at an opposite end of the transport path driven by the endless loop transmission element; and
a one-way clutch to allow rotation of the driven gear in one direction and resist rotation of the driven gear in an opposite direction,
the drive system to rotate the endless loop transmission element in the one direction to move the media clamp along the transport path and transport media from the one end of the transport path toward the opposite end of the transport path.

9. The media transport system of claim 8, wherein the one-way clutch includes an inner race mounted on a clutch shaft interlocked with the driven gear and an outer race retained by a clutch holder.

10. The media transport system of claim 8, wherein the drive system includes a drive motor to rotate the endless loop transmission element in the one direction with the drive gear.

11. The media transport system of claim 10, wherein the drive motor is to be operated in reverse, and reverse rotation from the drive motor exceeding a threshold indicates insufficient tension of the endless loop transmission element.

12. A method of operating a media transport system, comprising:
rotating a drive gear in a first direction;
transmitting rotation of the drive gear to a driven gear with an endless loop transmission element engaged with the drive gear and the driven gear; and
allowing rotation of the driven gear in the first direction with a one-way clutch and resisting rotation of the driven gear in a second direction opposite the first direction with the one-way clutch,
wherein rotating the drive gear in the first direction is to transport media toward the driven gear with a clamp secured to the endless loop transmission element.

13. The method of claim 12, wherein rotating the drive gear includes operating a drive motor and transmitting rotation from the drive motor to the drive gear.

14. The method of claim 13, further comprising:
reversing operation of the drive motor,
wherein resisting rotation of the driven gear in the second direction includes resisting reverse rotation from the drive motor.

15. The method of claim 13, further comprising:
determining tension of the endless loop transmission element, including reversing operation of the drive motor and measuring reverse rotation from the drive motor,
wherein measuring reverse rotation from the drive motor exceeding a threshold indicates insufficient tension of the endless loop transmission element.

* * * * *